US012565616B2

(12) United States Patent
Choi

(10) Patent No.: US 12,565,616 B2
(45) Date of Patent: Mar. 3, 2026

(54) LIQUID MULCHING AGENT COMPOSITION CONTAINING SEAWEED EXTRACT

(71) Applicant: CELLPACK Corp., Jeju-si (KR)

(72) Inventor: Young Doo Choi, Jeju-si (KR)

(73) Assignee: CELLPACK CORP., Jeju-si (KR)

( * ) Notice: Subject to any disclaimer, the term of this patent is extended or adjusted under 35 U.S.C. 154(b) by 456 days.

(21) Appl. No.: 18/127,758

(22) Filed: Mar. 29, 2023

(65) Prior Publication Data

US 2024/0110097 A1 Apr. 4, 2024

(30) Foreign Application Priority Data

Sep. 30, 2022 (KR) ........................ 10-2022-0124846

(51) Int. Cl.
| | |
|---|---|
| *C09K 17/52* | (2006.01) |
| *A01G 13/35* | (2025.01) |
| *C08L 5/04* | (2006.01) |
| *A01G 13/00* | (2006.01) |

(52) U.S. Cl.
CPC .............. *C09K 17/52* (2013.01); *A01G 13/35* (2025.01); *C08L 5/04* (2013.01); *A01G 2013/004* (2013.01)

(58) Field of Classification Search
CPC ..... A01G 13/35; A01G 2013/004; C08L 5/04; C09K 17/52
See application file for complete search history.

(56) References Cited

FOREIGN PATENT DOCUMENTS

| | | | | | |
|---|---|---|---|---|---|
| KR | 102169864 B1 | * | 10/2020 | ............. | A01G 13/35 |
| KR | 20200122702 A | * | 10/2020 | ............. | A01G 13/33 |
| KR | 10-2266277 | | 6/2021 | | |

* cited by examiner

*Primary Examiner* — Gerard Higgins
(74) *Attorney, Agent, or Firm* — LEX IP MEISTER, PLLC

(57) ABSTRACT

Disclosed is a liquid mulching agent composition, which is environmentally friendly due to use of seaweed, facilitates soil coating, and has high light blocking efficiency, making it possible to control heat retention and water content in the soil. The liquid mulching agent composition includes a seaweed extract, a first component including at least one selected from the group consisting of humic acid, fulvic acid, and charcoal, and a second component including at least one selected from the group consisting of sodium alginate, polyvinyl alcohol, keratin, and sodium silicate.

5 Claims, 7 Drawing Sheets

| Example 1 | Example 2 | Example 3 |

LIQUID MULCHING AGENT COMPOSITION CONTAINING SEAWEED EXTRACT

CROSS REFERENCE TO RELATED APPLICATION

This application claims the benefit of priority to Korean Patent Application No. 10-2022-0124846 filed on Sep. 30, 2022, the entire contents of which are incorporated herein by reference.

BACKGROUND OF THE INVENTION

Field of the Invention

The present disclosure relates to a liquid mulching agent composition including a seaweed extract.

Description of the Related Art

In order to effectively and economically respond to various pests and climate change in addition to soil moistening during typical agricultural production, the use of mulching means is emerging as an essential element. As conventional mulching means, vinyl mulching films have been used, but vinyl mulching films are not easy to treat after use, causing serious environmental pollution. In particular, vinyl mulching films are difficult to decompose under natural conditions, and thus, when remaining in the soil, such vinyl mulching films not only act as obstacles to plant growth, but also may cause serious pollution in the soil and the environment for a long time.

Moreover, when incineration is performed to remove vinyl mulching films, various harmful substances such as dioxins and the like are generated, polluting the atmosphere, which is undesirable.

With the goal of solving this problem, recently, a mulching film that is naturally biodegradable has been developed and used. These biodegradable mulching films are mainly manufactured by mixing polymer materials such as polyethylene, polyethylene oxide, polyvinyl alcohol, etc. with biodegradable materials such as starch, etc.

However, manufacture of such a biodegradable mulching film is expensive, and even when applied to an actual field, there is a problem in that it does not provide particularly improved advantages compared to conventional vinyl mulching films.

Meanwhile, seaweed sticks to the surface of fishing boats or is wound on propellers, etc., interfering with fishing operations and navigation, damaging near-sea fisheries, and being pushed and piled up on a large scale on the shore, thus spoiling the landscape or giving off an offensive odor due to decomposition thereof. There is no suitable method for treatment of the recovered seaweed, and currently, only a method of using the same as compost or incinerating or landfilling the same is provided. Hence, technology capable of using such seaweed in an environmentally friendly manner is required.

CITATION LIST

Patent Literature (Patent Document 1) Korea Patent No. 10-2266277 (Jun. 18, 2021)

SUMMARY OF THE INVENTION

An object of the present disclosure is to provide a liquid mulching agent composition, which is environmentally friendly due to use of seaweed, facilitates soil coating, and has high light blocking efficiency to thus increase heat retention and control water content in soil.

In order to accomplish the above object, the present disclosure provides a liquid mulching agent composition including a seaweed extract, a first component including at least one selected from the group consisting of humic acid, fulvic acid, and charcoal, and a second component including at least one selected from the group consisting of sodium alginate, polyvinyl alcohol, keratin, and sodium silicate.

Also, the liquid mulching agent composition according to the present disclosure may further include a third component including at least one selected from the group consisting of a waste brewery yeast byproduct, a coffee waste extract, an extract from citrus pomaces, and an extract from rice wine residue or a fourth component that is a mixture of carboxymethylcellulose (CMC) and propylene glycol alginate.

Also, the liquid mulching agent composition according to the present disclosure may include, based on the total weight thereof, 55 to 85 wt % of the seaweed extract, 1 to 15 wt % of the first component, 1 to 25 wt % of the second component, 1 to 15 wt % of the third component, and 0.1 to 5 wt % of the fourth component.

Also, the liquid mulching agent composition according to the present disclosure may further include 0.1 to 5 wt % of sodium polyacrylate based on the total weight thereof.

DETAILED DESCRIPTION OF THE INVENTION

Figure 1:
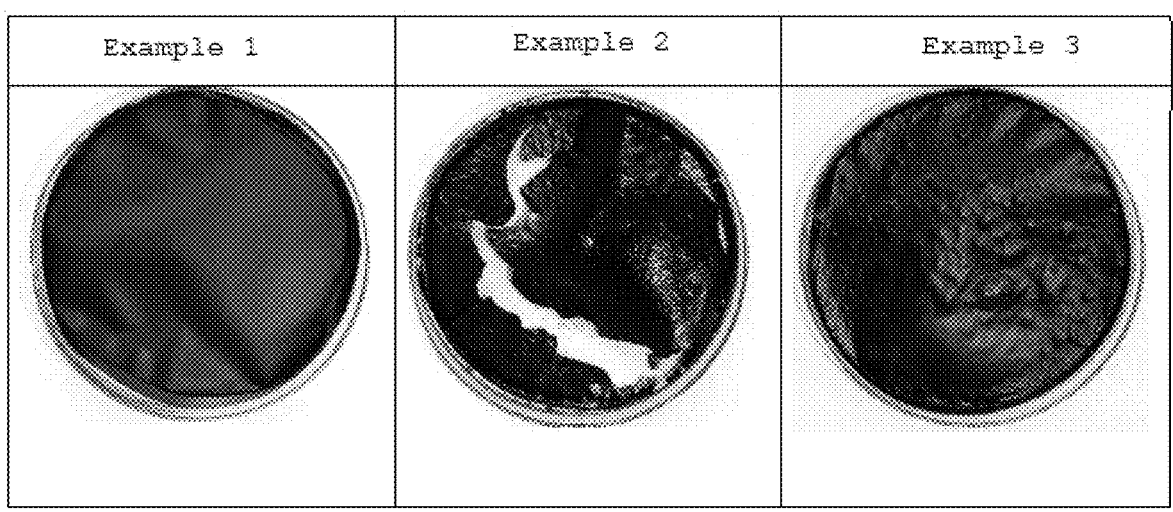
FIG. 1 shows photographs of films formed of liquid mulching agent compositions of Examples 1 to 3 according to the present disclosure.

Hereinafter, the present disclosure will be described in more detail with reference to exemplary embodiments and examples so that those skilled in the art may easily implement the present disclosure. However, the present disclosure may be embodied in many different forms, and is not limited to the embodiments and examples described herein.

An aspect of the present disclosure pertains to a liquid mulching agent composition including a seaweed extract, a first component including at least one selected from the group consisting of humic acid, fulvic acid, and charcoal, and a second component including at least one selected from the group consisting of sodium alginate, polyvinyl alcohol, keratin, and sodium silicate.

In an embodiment of the present disclosure, the seaweed extract is a component added to improve biodegradability, make the color of a film formed of the liquid mulching agent composition close to black, and increase light blocking efficiency, and is used in an amount of 60 to 85 wt %, preferably 65 to 80 wt %, more preferably 70 to 79 wt %, based on the total weight of the liquid mulching agent composition. If the amount of the seaweed extract is less than 60 wt %, black color may not result and light blocking efficiency may decrease, whereas if the amount thereof exceeds 85 wt %, film formation may not be easy.

Examples of the seaweed may include brown algae and red algae, and specifically, the brown algae may include at least one selected from the group consisting of *Sargassum horneri, Sargassum fulvellum, Sargassum, Sargassum coreanum, Sargassum micracanthum, Sargassum serratifolium, Sargassum sagamianum, Sargassum confusum, Sargassum siliquastrum, Sargassum thumbergii, Undaria pinnatifida, Ecklonia cava*, and *Sargassum fusiforme*, and is preferably *Sargassum horneri*.

In an embodiment of the present disclosure, the first component that is used along with the seaweed extract is a component added to make the color of a film formed of the liquid mulching agent composition close to black and easily form a film, and is used in an amount of 1 to 15 wt %, preferably 2 to 8 wt %, more preferably 3 to 5 wt %, based on the total weight of the liquid mulching agent composition. If the amount of the first component is less than 1 wt %, the color of the film may not be black, whereas if the amount thereof exceeds 15 wt %, film formation may not be easy.

The first component may include at least one selected from the group consisting of humic acid, fulvic acid, and charcoal, and is preferably humic acid.

In an embodiment of the present disclosure, the second component is a component added to facilitate formation of a film with the liquid mulching agent composition and improve the quality of the film, and is used in an amount of 3 to 25 wt %, preferably 5 to 15 wt %, more preferably 6 to 10 wt %, based on the total weight of the liquid mulching agent composition. If the amount of the second component is less than 3 wt %, film formation may not be easy, whereas if the amount thereof exceeds 25 wt %, a large amount of bubbles may be generated on the surface of the film, resulting in poor quality and poor adhesion to soil.

The second component may be an organic film-forming agent or an inorganic film-forming agent. Here, the organic film-forming agent may be sodium alginate, polyvinyl alcohol, or keratin, and the inorganic film-forming agent may be sodium silicate. The second component is preferably an aqueous solution of sodium alginate serving as an organic film-forming agent.

In an embodiment of the present disclosure, the liquid mulching agent composition may further include a third component including at least one selected from the group consisting of waste brewery yeast byproducts, coffee waste extracts, extracts from citrus pomaces, and extracts from rice wine residue or a fourth component that is a mixture of carboxymethylcellulose (CMC) and propylene glycol alginate, and preferably includes both the third component and the fourth component.

In an embodiment of the present disclosure, the third component is a component added to help growth of plants, and is used in an amount of 1 to 18 wt %, preferably 5 to 15 wt %, more preferably 8 to 12 wt %, based on the total weight of the liquid mulching agent composition. If the amount of the third component is less than 1 wt %, film formation may not be easy, whereas if the amount thereof exceeds 18 wt %, formulation stability of the liquid mulching agent composition may be deteriorated.

The third component may include at least one, preferably at least three, selected from the group consisting of waste brewery yeast byproducts, coffee waste extracts, extracts from citrus pomaces, and extracts from rice wine residue.

The waste brewery yeast byproduct may be a supernatant obtained through layer separation of waste brewery yeast (sludge) generated after beer production. The extract from citrus pomaces may include at least one selected from the group consisting of a citrus peel extract, a Dekopon peel extract, a Setoka peel extract, and a Kanpei peel extract, and is preferably a citrus peel extract.

In an embodiment of the present disclosure, the fourth component is a component added to improve formulation stability of a film formed of the liquid mulching agent composition, and is used in an amount of 0.05 to 5 wt %, preferably 0.1 to 3 wt %, more preferably 0.5 to 2.5 wt %, based on the total weight of the liquid mulching agent composition. If the amount of the fourth component is less than 0.05 wt % or exceeds 5 wt %, formulation stability of the liquid mulching agent composition may be deteriorated.

The fourth component may be a mixture of CMC (carboxymethylcellulose) and propylene glycol alginate, and it is preferable for film formation that the amount of CMC be greater than the amount of propylene glycol alginate.

In an embodiment of the present disclosure, the liquid mulching agent composition may also include sodium polyacrylate in an amount of 0.05 to 5 wt %, preferably 0.1 to 3 wt %, more preferably 0.3 to 2 wt % of based on the total weight thereof, in order to maintain water content in the soil by the formed film.

If the amount of sodium polyacrylate is less than 0.05 wt %, effectiveness of the film for maintaining water content in the soil may be deteriorated, whereas if the amount thereof exceeds 5 wt %, the surface of the film may not be uniform, resulting in a large number of bubbles and poor adhesion to the soil.

In the present disclosure, the extract includes an extract solution alone and all extract formulations that may be formed using the extract solution, such as an extract solution obtained through extraction treatment, a diluted solution or concentrate of the extract solution, a dried product obtained by drying the extract solution, a crude or purified product of the extract solution, or mixtures thereof.

The extract may be prepared through a typical extraction process, particularly a solvent extraction process, a water immersion extraction process, a cold extraction process, a warm extraction process, an ultrasonic extraction process, etc., using a typical extractor, ultrasonic extractor, or fractionator.

The extraction solvent of the extract may be water or an organic solvent, preferably water. The organic solvent may be a polar solvent, a non-polar solvent, or a mixture thereof, and examples thereof may include alcohol, alcohol diluted water, hexane, methylene chloride, acetone, ethyl acetate, ethyl ether, chloroform, and mixtures thereof, and the alcohol may be a $C_1$-$C_5$ alcohol, such as methanol, ethanol, propanol, butanol, isopropanol, etc.

The extraction solvent may be added in an amount corresponding to 1 to 20 times, preferably 5 to 15 times the weight of a dried raw material. The extraction temperature may be 60 to 100° C., preferably 80 to 100° C. Also, the extraction time may be 1 to 6 hours, preferably 3 to 5 hours.

A better understanding of the present disclosure may be obtained through the following examples.

Materials

All of *Sargassum horneri*, coffee waste, waste brewery yeast, citrus peel, CMC, propylene glycol alginate, humic acid, sodium alginate, and sodium polyacrylate used herein were commercially purchased or collected.

Preparation Example 1: *Sargassum horneri* Extract

*Sargassum horneri* was dried with hot air at 50 to 60° C. for 3 to 5 hours and then subjected to hot water extraction at a temperature of 80 to 100° C. for 4 hours using water in an amount corresponding to 10 times the weight of *Sargassum horneri*. Thereafter, a *Sargassum horneri* extract was prepared.

Preparation Example 2: Coffee Waste Extract

Coffee waste was dried with hot air at 50 to 60° C. for 3 to 5 hours and then subjected to hot water extraction at a temperature of 80 to 100° C. for 4 hours using water in an amount corresponding to 10 times the weight of coffee waste. Thereafter, a coffee waste extract was prepared.

Preparation Example 3: Waste Brewery Yeast Byproduct

Waste brewery yeast (sludge) collected after beer production in Jeju Beer was subjected to layer separation, after which a supernatant was obtained.

Preparation Example 4: Citrus Peel Extract

Citrus peel was dried with hot air at 50 to 60° C. for 3 to 5 hours and then subjected to hot water extraction at a temperature of 80 to 100° C. for 4 hours using water in an amount corresponding to 10 times the weight of citrus peel. Thereafter, a citrus peel extract was prepared through filtration under reduced pressure.

Preparation Example 5: 5 wt % Aqueous Solution of Sodium Alginate

A 5 wt % aqueous solution of sodium alginate was prepared by adding water to sodium alginate and performing heat stirring at 80 to 100° C. for 2 hours.

Examples 1 to 3

The *Sargassum horneri* extract, coffee waste extract, waste brewery yeast byproduct, and citrus peel extract prepared in Preparation Examples 1 to 4 were mixed together, and CMC and propylene glycol alginate were mixed therewith, followed by heat stirring at 70 to 80° C. for 30 to 60 minutes and mixing to obtain a mixture. Thereafter, humic acid was added to the mixture, followed by heat stirring at 70 to 80° C. for 30 to 60 minutes, addition of the 5% aqueous solution of sodium alginate prepared in Preparation Example 5, and additional heat stirring at 70 to 80° C. for 30 to 60 minutes, thereby yielding respective liquid mulching agent compositions. The wt % of components is shown in Table 1 below.

TABLE 1

| Classification | Example 1 | Example 2 (unit: wt %) | Example 3 |
|---|---|---|---|
| Preparation Example 1 | 76.5 | 70.5 | 64.5 |
| Preparation Example 2 | 4 | 4 | 4 |
| Preparation Example 3 | 2 | 2 | 2 |
| Preparation Example 4 | 3.76 | 3.76 | 3.76 |
| CMC | 1.14 | 1.14 | 1.14 |
| Propylene glycol alginate | 0.6 | 0.6 | 0.6 |
| Humic acid | 4 | 10 | 4 |
| Preparation Example 5 | 8 | 8 | 20 |

Examples 4 to 6

The *Sargassum horneri* extract, coffee waste extract, waste brewery yeast byproduct, and citrus peel extract prepared in Preparation Examples 1 to 4 were mixed together, and CMC and propylene glycol alginate were mixed therewith, followed by heat stirring at 70 to 80° C. for 30 to 60 minutes and mixing to obtain a mixture. Thereafter, humic acid was added to the mixture, followed by heat stirring at 70 to 80° C. for 30 to 60 minutes, addition of the 5% aqueous solution of sodium alginate prepared in Preparation Example 5, additional heat stirring at 70 to 80° C. for 30 to 60 minutes, further addition of sodium polyacrylate, and heat stirring at 70 to 80° C. for 30 to 60 minutes, thereby yielding respective liquid mulching agent compositions. The wt % of components is shown in Table 2 below.

TABLE 2

| Classification | Example 4 | Example 5 (unit: wt %) | Example 6 |
|---|---|---|---|
| Preparation Example 1 | 76 | 70 | 64 |
| Preparation Example 2 | 4 | 4 | 4 |
| Preparation Example 3 | 2 | 2 | 2 |
| Preparation Example 4 | 3.76 | 3.76 | 3.76 |
| CMC | 1.14 | 1.14 | 1.14 |
| Propylene glycol alginate | 0.6 | 0.6 | 0.6 |
| Humic acid | 4 | 10 | 4 |
| Preparation Example 5 | 8 | 8 | 20 |
| Sodium polyacrylate | 0.5 | 0.5 | 0.5 |

Comparative Examples 1 to 6

The *Sargassum horneri* extract, coffee waste extract, waste brewery yeast byproduct, and citrus peel extract prepared in Preparation Examples 1 to 4 and water were mixed together, and CMC and propylene glycol alginate were mixed therewith, followed by heat stirring at 70 to 80° C. for 30 to 60 minutes and mixing to obtain a mixture. Thereafter, humic acid was added to the mixture, followed by heat stirring at 70 to 80° C. for 30 to 60 minutes, addition of the 5% aqueous solution of sodium alginate prepared in Preparation Example 5, and additional heat stirring at 70 to 80° C. for 30 to 60 minutes, thereby yielding respective liquid mulching agent compositions. The wt % of components is shown in Table 3 below.

TABLE 3

| Classification | Com. Example 1 | Com. Example 2 | Com. Example 3 (unit: wt %) | Com. Example 4 | Com. Example 5 | Com. Example 6 |
|---|---|---|---|---|---|---|
| Water | 76.5 | 4 | 8 | 46.5 | 3.5 | 6 |
| Preparation Example 1 | 0 | 76.5 | 76.5 | 30 | 76.5 | 76.5 |
| Preparation Example 2 | 4 | 4 | 4 | 4 | 4 | 4 |
| Preparation Example 3 | 2 | 2 | 2 | 2 | 2 | 2 |
| Preparation Example 4 | 3.76 | 3.76 | 3.76 | 3.76 | 3.76 | 3.76 |
| CMC | 1.14 | 1.14 | 1.14 | 1.14 | 1.14 | 1.14 |
| Propylene glycol alginate | 0.6 | 0.6 | 0.6 | 0.6 | 0.6 | 0.6 |
| Humic acid | 4 | 0 | 4 | 4 | 0.5 | 4 |
| Preparation Example 5 | 8 | 8 | 0 | 8 | 8 | 2 |

Comparative Examples 7 to 12

The *Sargassum horneri* extract, coffee waste extract, waste brewery yeast byproduct, and citrus peel extract prepared in Preparation Examples 1 to 4 and water were mixed together, and CMC and propylene glycol alginate were mixed therewith, followed by heat stirring at 70 to 80° C. for 30 to 60 minutes and mixing to obtain a mixture. Thereafter, humic acid was added to the mixture, followed by heat stirring at 70 to 80° C. for 30 to 60 minutes, addition of the 5% aqueous solution of sodium alginate prepared in Preparation Example 5, additional heat stirring at 70 to 80° C. for 30 to 60 minutes, further addition of sodium poly-acrylate, and heat stirring at 70 to 80° C. for 30 to 60 minutes, thereby yielding respective liquid mulching agent compositions. The wt % of components is shown in Table 4 below.

TABLE 4

| Classification | Com. Example 7 | Com. Example 8 | Com. Example 9 (unit: wt %) | Com. Example 10 | Com. Example 11 | Com. Example 12 |
|---|---|---|---|---|---|---|
| Water | 76 | 4 | 8 | 46 | 3.5 | 6 |
| Preparation Example 1 | 0 | 76 | 76 | 30 | 76 | 76 |
| Preparation Example 2 | 4 | 4 | 4 | 4 | 4 | 4 |
| Preparation Example 3 | 2 | 2 | 2 | 2 | 2 | 2 |
| Preparation Example 4 | 3.76 | 3.76 | 3.76 | 3.76 | 3.76 | 3.76 |
| CMC | 1.14 | 1.14 | 1.14 | 1.14 | 1.14 | 1.14 |
| Propylene glycol alginate | 0.6 | 0.6 | 0.6 | 0.6 | 0.6 | 0.6 |
| Humic acid | 4 | 0 | 4 | 4 | 0.5 | 4 |
| Preparation Example 5 | 8 | 8 | 0 | 8 | 8 | 2 |
| Sodium polyacrylate | 0.5 | 0.5 | 0.5 | 0.5 | 0.5 | 0.5 |

Comparative Example 13

A commercially available liquid mulching agent composition (Power Gella) was prepared.

Experimental Example

Figure 2:
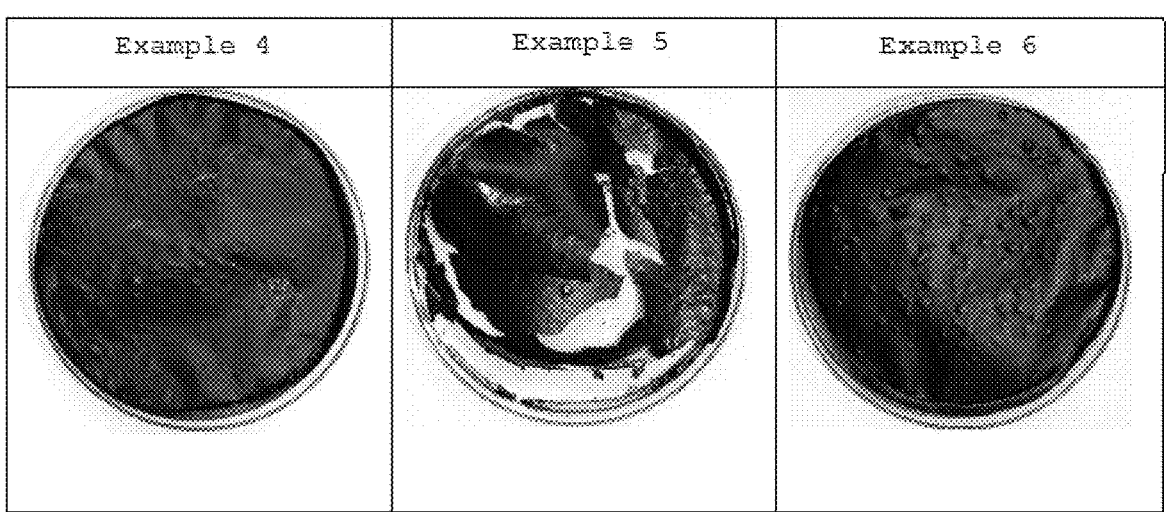
FIG. 2 shows photographs of films formed of liquid mulching agent compositions of Examples 4 to 6 according to the present disclosure.
Figure 3:
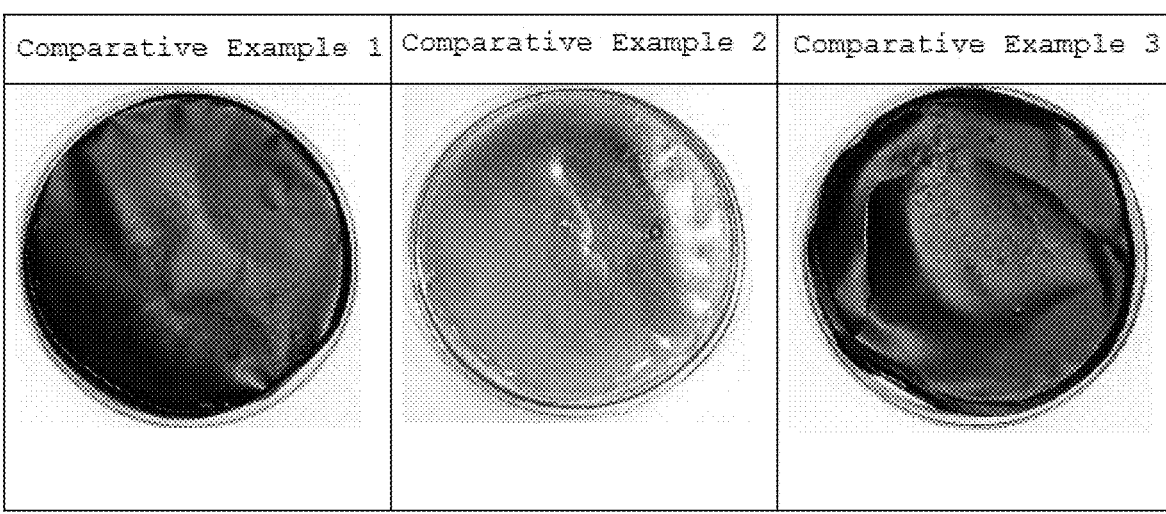
FIG. 3 shows photographs of films formed of liquid mulching agent compositions of Comparative Examples 1 to 3 according to the present disclosure.
Figure 4:
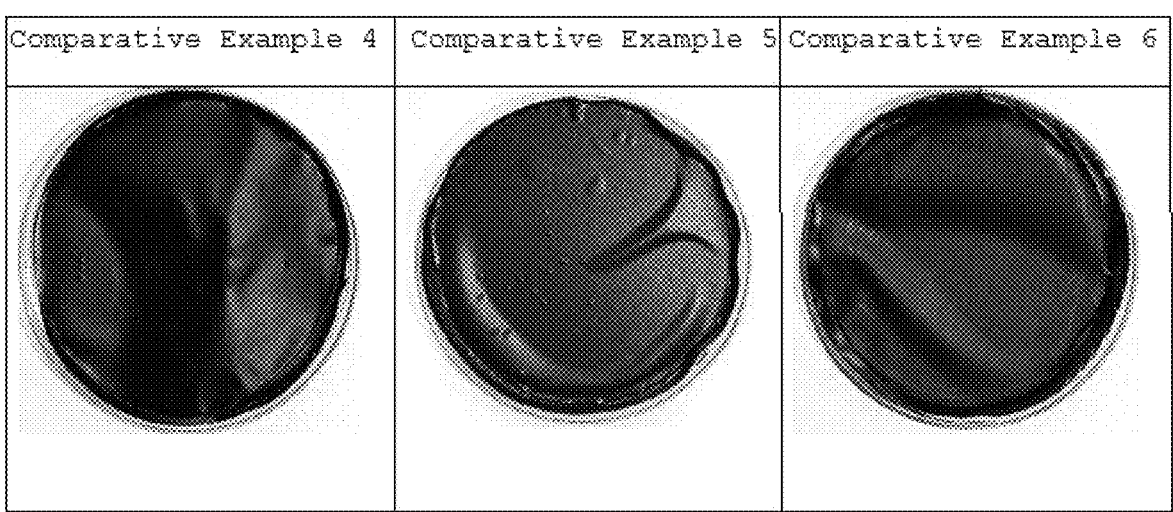
FIG. 4 shows photographs of films formed of liquid mulching agent compositions of Comparative Examples 4 to 6 according to the present disclosure.
Figure 5:
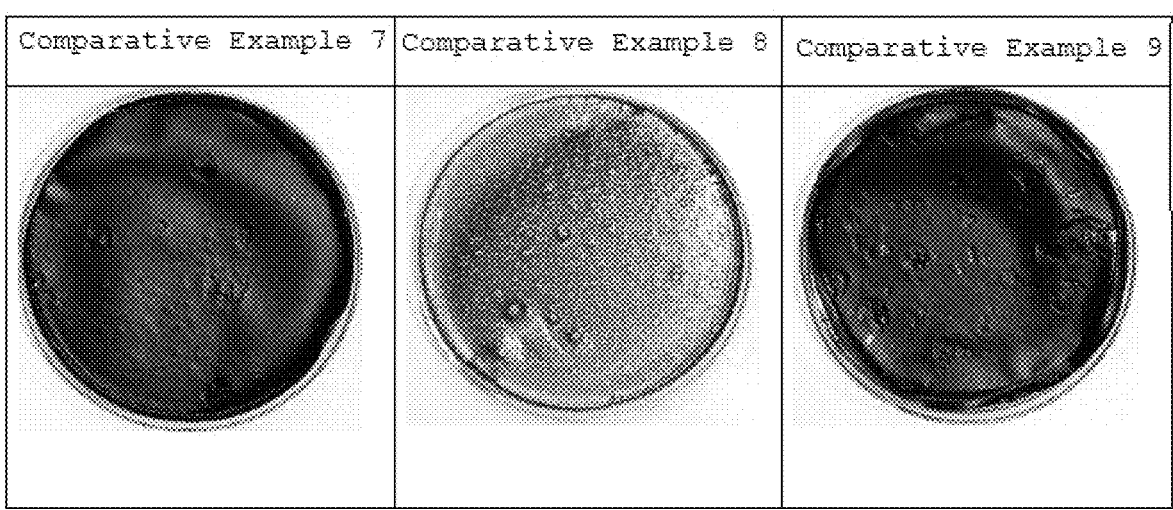
FIG. 5 shows photographs of films formed of liquid mulching agent compositions of Comparative Examples 7 to 9 according to the present disclosure.
Figure 6:
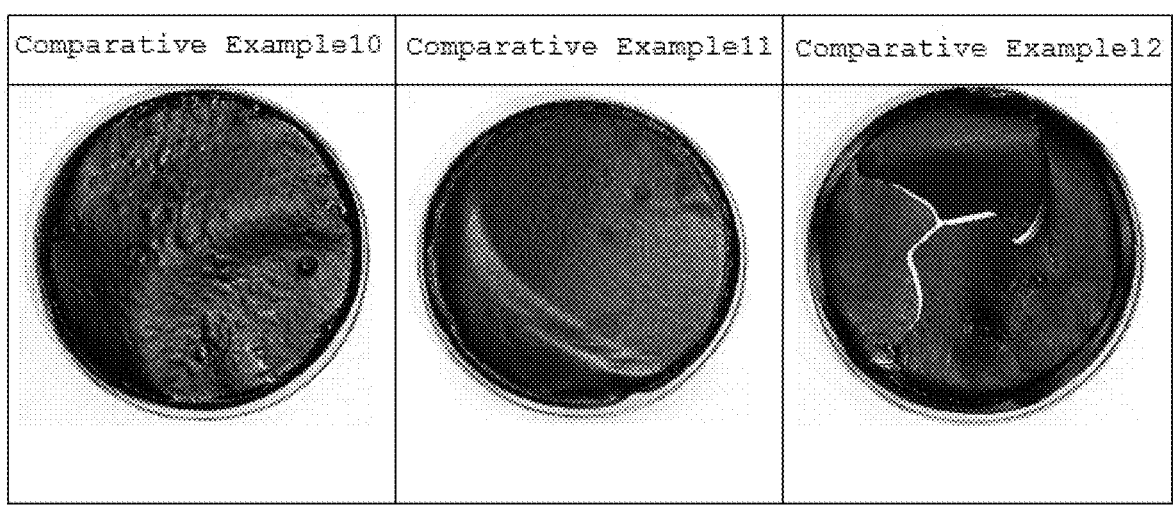
FIG. 6 shows photographs of films formed of liquid mulching agent compositions of Comparative Examples 10 to 12 according to the present disclosure.
Figure 7:
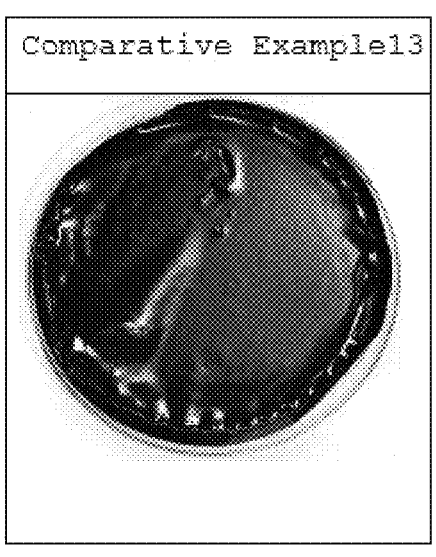
FIG. 7 shows a photograph of a film formed of a liquid mulching agent composition of Comparative Example 13 according to the present disclosure.

The liquid mulching agent composition of each of Examples 1 to 6 and Comparative Examples 1 to 13 was dried at 40° C. for 2 hours, after which the color, film formation, and light blocking efficiency thereof were measured using the following measurement methods, and the results thereof are shown in Table 5 below. Also, the surface of the dried film was photographed, and the results thereof are shown in FIGS. 1 to 7.

[Measurement Method]

Color: Whether black color is displayed is measured with the naked eye through a 5-point evaluation method Film formation: The extent of cracking and formation of a film is measured with the naked eye through a 5-point evaluation method Light blocking efficiency: The extent of light transmission is measured with the naked eye using a lantern through a 5-point evaluation method.

TABLE 5

| Classification | Color | Film formation | Light blocking efficiency |
|---|---|---|---|
| Example 1 | 4.7 | 4.8 | 4.8 |
| Example 2 | 4.9 | 2.7 | 4.9 |
| Example 3 | 4.1 | 4.1 | 4.0 |
| Example 4 | 4.8 | 4.8 | 4.7 |
| Example 5 | 4.9 | 2.8 | 4.9 |
| Example 6 | 4.2 | 4.1 | 4.0 |
| Com. Example 1 | 4.2 | 4.0 | 3.7 |

TABLE 5-continued

| Classification | Color | Film formation | Light blocking efficiency |
|---|---|---|---|
| Com. Example 2 | 2.5 | 3.7 | 2.5 |
| Com. Example 3 | 4.3 | 3.5 | 4.3 |
| Com. Example 4 | 4.1 | 3.8 | 4.2 |
| Com. Example 5 | 3.7 | 4.4 | 3.6 |
| Com. Example 6 | 4.1 | 3.4 | 4.2 |
| Com. Example 7 | 4.1 | 3.9 | 3.8 |
| Com. Example 8 | 2.5 | 3.8 | 2.5 |
| Com. Example 9 | 4.1 | 3.7 | 4.7 |
| Com. Example 10 | 4.1 | 3.9 | 4.3 |
| Com. Example 11 | 3.5 | 4.3 | 3.5 |
| Com. Example 12 | 4.3 | 3.3 | 4.4 |
| Com. Example 13 | 4.4 | 4.5 | 4.3 |

With reference to Table 5 and FIGS. 1 to 5, Examples 1 and 4 including the *Sargassum horneri* extract were superior in all of appearance, film formation, and light blocking efficiency compared to Comparative Examples 1 and 7 including water in lieu of the *Sargassum horneri* extract.

In addition, Examples 1 and 4 including the *Sargassum horneri* extract were superior in all of appearance, film formation, and light blocking efficiency compared to Comparative Examples 4 and 10 including both the *Sargassum horneri* extract and water.

In addition, when the amount of humic acid was 8 wt % (Examples 1 and 4), film formation was good or the appearance or light blocking efficiency was superior compared to when the amount thereof was 10 wt % (Examples 2 and 5) or 0.5 wt % (Comparative Examples 5 and 12), and all of the appearance, film formation, and light blocking efficiency were superior compared to when humic acid was not included (Comparative Examples 2 and 8).

In addition, when the amount of the 5% aqueous solution of sodium alginate was 8 wt % (Examples 1 and 4), surface uniformity was superior due to a small amount of bubbles on the film surface compared to when the amount thereof was 20 wt % (Examples 3 and 6) or 2 wt % (Comparative Examples 6 and 12), and also, film formation was good or the appearance or light blocking efficiency was superior. In addition, all of the appearance, film formation, and light blocking efficiency were superior compared to when the 5% aqueous solution of sodium alginate was not included (Comparative Examples 3 and 9).

In addition, when sodium polyacrylate was included (Example 4), the appearance, film formation, and light blocking efficiency were not deteriorated compared to when sodium polyacrylate was not included (Example 1), indicating that the resulting mulching agent can be applied to the soil to help maintain water content in the soil.

In addition, the liquid mulching agent compositions of Examples 1 and 4 were superior in appearance, film formation, and light blocking efficiency compared to the commercially available product (Comparative Example 13).

Therefore, the liquid mulching agent composition according to the present disclosure has high light blocking efficiency, making it possible to control water content in the soil, so that it is able to easily supply water necessary for plant growth, has high soil adsorption capacity, and is biodegradable due to use of a seaweed extract, and the surface quality of a film formed of components in specific wt % is excellent.

As is apparent from the above description, a mulching agent according to the present disclosure is liquid, and can thus be easily applied compared to conventional vinyl mulching films, is hardly affected by characteristics of the applied topography, is able to easily control the coating level, has high mulching (coating) efficiency, and obviates recovery after application, saving labor costs.

In addition, since light blocking efficiency thereof is high, it is possible to control water content in the soil, so that water necessary for plant growth is easily supplied, and soil adsorption capacity is high.

In addition, the mulching agent includes a seaweed extract and is thus biodegradable, and surface quality of a film resulting from use of a second component in a specific weight is good.

As described hereinbefore, preferred embodiments of the present disclosure have been described in detail. The description of the present disclosure is for illustrative purposes, and those skilled in the art will appreciate that various modifications are possible without departing from the technical spirit or essential features of the present disclosure.

Therefore, the scope of the present disclosure is indicated by the following claims rather than the detailed description, and all changes or modifications derived from the meaning, scope, and equivalent concepts of the claims are construed to be included in the scope of the present disclosure.

What is claimed is:

1. A liquid mulching agent composition, comprising:
a seaweed extract;
a first component comprising at least one selected from the group consisting of humic acid, fulvic acid, and charcoal;
a second component comprising at least one selected from the group consisting of sodium alginate, polyvinyl alcohol, keratin, and sodium silicate;
a third component comprising at least one selected from the group consisting of a waste brewery yeast byproduct, a coffee waste extract, an extract from citrus pomaces, and an extract from rice wine residue; and
a fourth component that is a mixture of carboxymethylcellulose (CMC) and propylene glycol alginate,
wherein the liquid mulching agent composition comprises, based on a total weight thereof, 60 to 85 wt % of the seaweed extract, 1 to 15 wt % of the first component, 3 to 25 wt % of the second component, 1 to 18 wt % of the third component, and 0.05 to 5 wt % of the fourth component.

2. The liquid mulching agent composition according to claim 1, wherein the seaweed comprises brown algae or red algae.

3. The liquid mulching agent composition according to claim 2, wherein the brown algae comprises at least one selected from the group consisting of *Sargassum horneri, Sargassum fulvellum, Sargassum, Sargassum coreanum, Sargassum micracanthum, Sargassum serratifolium, Sargassum sagamianum, Sargassum confusum, Sargassum siliquastrum, Sargassum thumbergii, Undaria pinnatifida, Ecklonia cava,* and *Sargassum fusiforme.*

4. The liquid mulching agent composition according to claim 1, wherein the extract from citrus pomaces comprises at least one selected from the group consisting of a citrus peel extract, a Dekopon peel extract, a Setoka peel extract, and a Kanpei peel extract.

5. The liquid mulching agent composition according to claim 1, further comprising 0.05 to 5 wt % of sodium polyacrylate based on the total weight thereof.

\* \* \* \* \*